(12) United States Patent
Watanabe

(10) Patent No.: US 7,627,707 B2
(45) Date of Patent: Dec. 1, 2009

(54) MICROSCOPE SYSTEM AND EXTENSION UNIT

(75) Inventor: Hideo Watanabe, Tokyo (JP)

(73) Assignee: Olympus Corporation, Tokyo (JP)

(*) Notice: Subject to any disclaimer, the term of this patent is extended or adjusted under 35 U.S.C. 154(b) by 104 days.

(21) Appl. No.: 11/977,495

(22) Filed: Oct. 25, 2007

(65) Prior Publication Data

US 2008/0114920 A1 May 15, 2008

(30) Foreign Application Priority Data

Nov. 10, 2006 (JP) ............................. 2006-305497

(51) Int. Cl.
*G06F 13/00* (2006.01)
(52) U.S. Cl. ...................................... 710/300; 710/316
(58) Field of Classification Search ................. 710/104, 710/300, 301, 313, 316
See application file for complete search history.

(56) References Cited

U.S. PATENT DOCUMENTS 6,339,806 B1 * 1/2002 Foster et al. ................. 710/313
6,587,968 B1 7/2003 Leyva
7,380,042 B2 * 5/2008 Wang et al. .................. 710/305
2002/0041601 A1 4/2002 Breinlinger
2005/0111086 A1 5/2005 Knoblich et al.
2005/0114577 A1 * 5/2005 Beckhoff et al. ............. 710/110

FOREIGN PATENT DOCUMENTS

| JP | 2000-165415 A | 6/2000 |
| JP | 2002-140139 A | 5/2002 |
| JP | 3538366 B2 | 3/2004 |
| JP | 2005-157340 A | 6/2005 |

* cited by examiner

*Primary Examiner*—Glenn A Auve
(74) *Attorney, Agent, or Firm*—Frishauf, Holtz, Goodman & Chick, P.C.

(57) ABSTRACT

A bus connection switch is connected in series at some point on a bus that transmits control data. The bus connection switch releases the bus at the position of the switch when being opened, or connects the bus when being closed. The bus is led from both sides of the bus connection switch to an extension connector. If an extension unit having a bus connection switch in a closed state is connected to the extension connector, the bus is connected via the extension unit. A detecting circuit comprised by an extension port opens the bus connection switch comprised by the extension port if detecting that an extension unit is connected to the extension connector comprised by the extension port, or closes the bus connection switch comprised by the extension port if detecting that an extension unit is not connected.

11 Claims, 10 Drawing Sheets

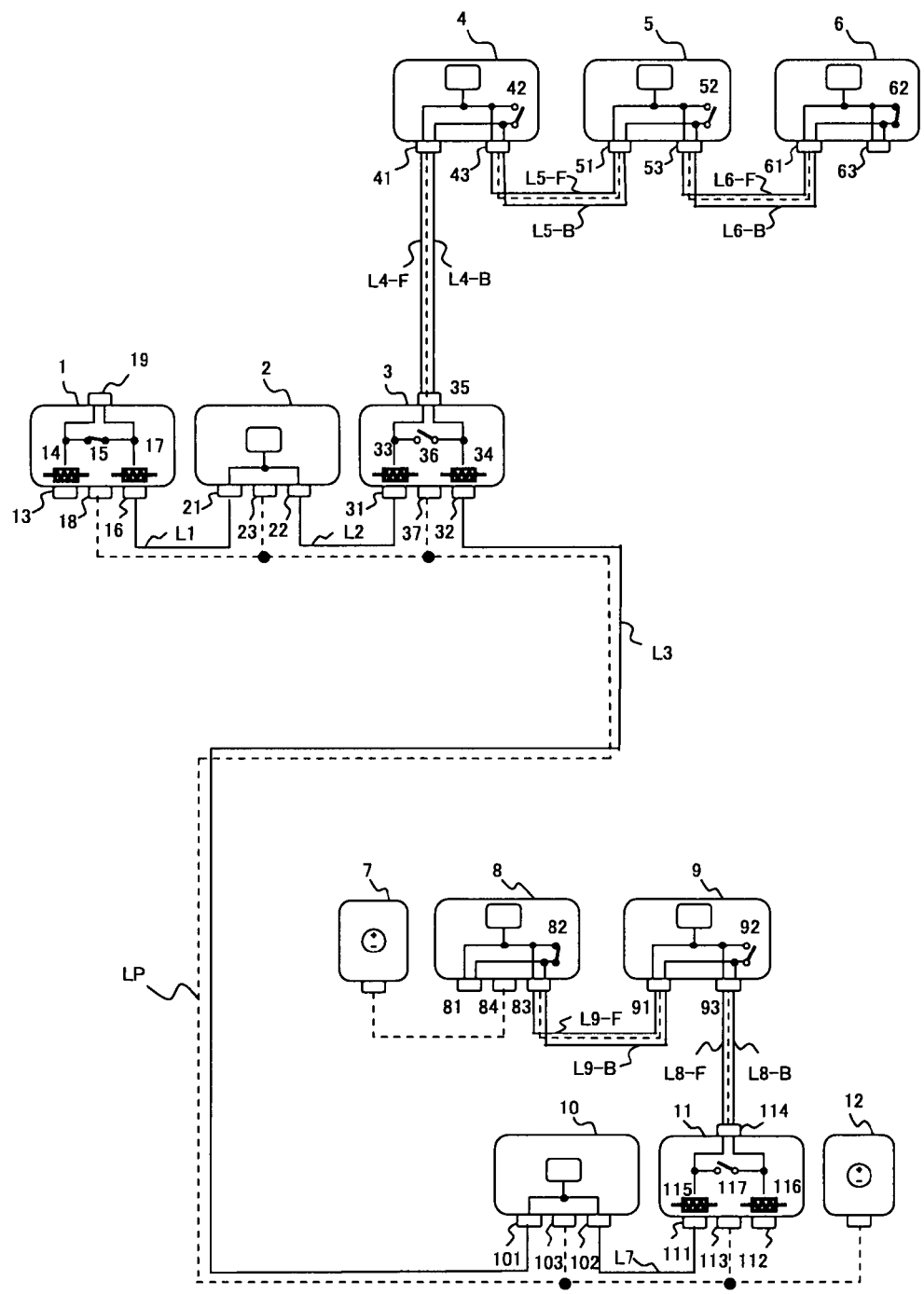
F I G. 1

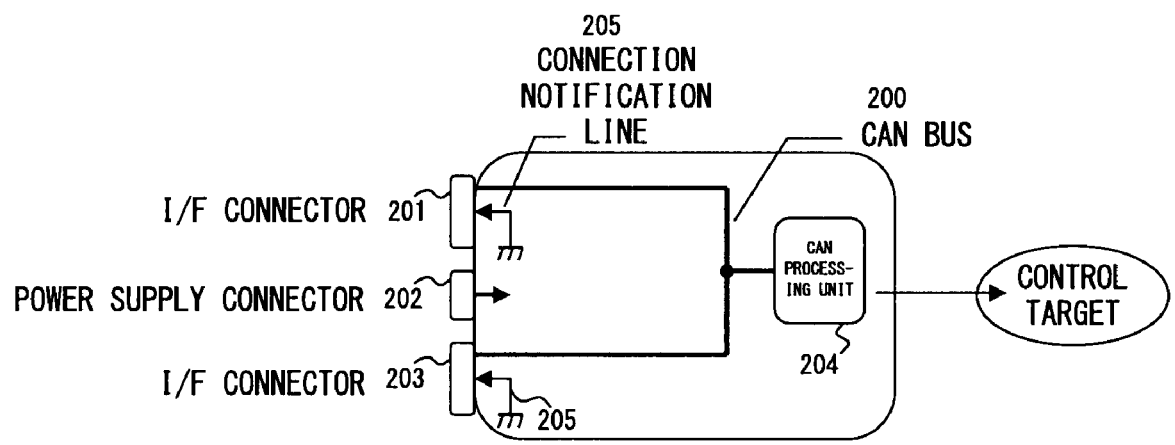
F I G. 2 A

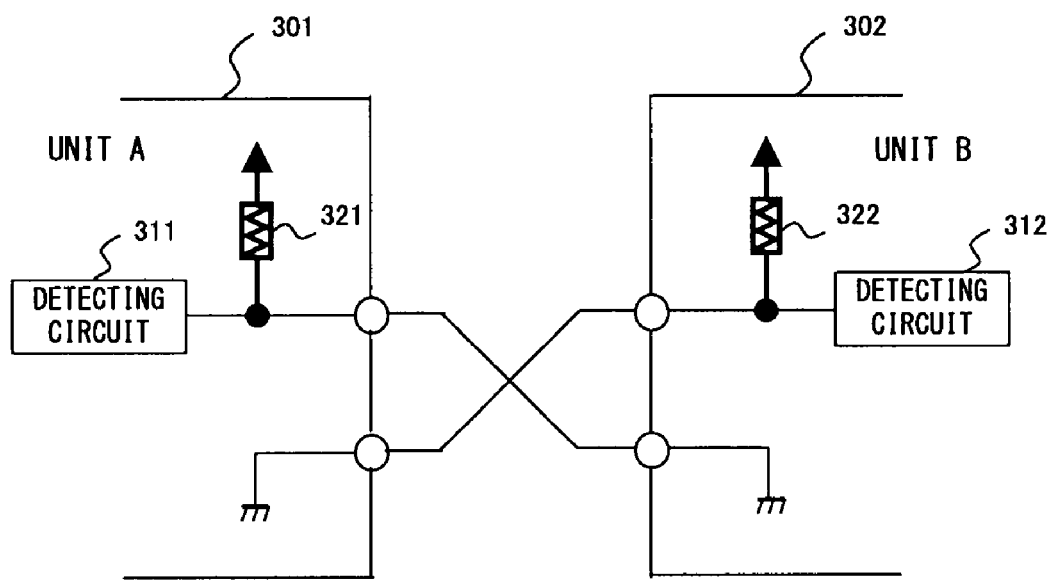
F I G. 3

MICROSCOPE SYSTEM AND EXTENSION UNIT

CROSS REFERENCE TO RELATED APPLICATIONS

This application claims benefit of Japanese Application No. 2006-305497, filed Nov. 10, 2006, the contents of which are incorporated by this reference.

BACKGROUND OF THE INVENTION

1. Field of the Invention

The present invention relates to a technique of a microscope, and more particularly, to a technique of a data communication made among the component units of a microscope system in order to electrically control the switching or the driving operations of various types of members provided in the microscope system.

2. Description of the Related Art

Recent microscopes have been put into components, and many of them adopt a unit configuration that is implemented by using optical functional units as a base (for example, see Japanese Published Unexamined Patent Application No. 2005-157340). Since optical elements required for an observation method, which is chosen according to an intended use, can be selected and combined for such microscopes, they can efficiently support various types of observation methods. Specifically, various types of units, in which optical elements such as objective lenses of multiple magnification factors, an optical filter, and the like are incorporated, are provided as the component units of a microscope. Such component units are configured so that a plurality of comprised optical elements can be switched. Additionally, some of such component units are configured to be attachable/detachable to/from a microscope.

In a microscope system constructed as an assembly of such various units, a controller that governs the control of the entire system, and units are interconnected with diverse cables in order to enable various types of data to be transmitted/received between the controller and the units. These cables can sometimes become long due to restrictions imposed on the arrangement of the controller and the units, leading to the possible lack of the neatness of the system. Additionally, influences on magnetic performance are unignorable in some cases.

As one means for overcoming such a situation, there is a method for controlling a microscope system with a controller area network (CAN) protocol. With CAN, a distributed control is performed, and data is transmitted/received by connecting a controller, which is comprised for each component unit, with a serial communication, so that an operation for controlling the entire system is performed. With this configuration, exclusive control wires from a controller are collected within a unit, and a bus (CAN bus) connection can be made as a connection for a data communication made among component units, whereby the degree of freedom of the configuration of the entire system is improved, and at the same time, improvements in wiring savings and performance can be expected.

Concerning the present invention, for example, Japanese Published Unexamined Patent Application No. 2000-165415, Japanese Published Unexamined Patent Application No. 2002-140139, and Japanese Registered Patent Publication No. 3538366 disclose the techniques for enabling a CAN bus to be suitably terminated.

In a microscope system having the above described unit configuration, a user normally performs operations for choosing a unit comprising an optical element required according to an observation method, and for assembling the microscope system. However, if the above described CAN is used for the system control of the microscope system, 2 ends (both ends) of a CAN bus, which is a two-wire line, must be terminated. If the ends are not properly terminated, problems such as a system startup failure, or the like can occur. It is difficult for a normal user to perform the operations for assembling the microscope system in consideration of this point.

To solve such a problem, the technique for automatically causing a unit in a succeeding stage to terminate a CAN bus if the unit is connected in the stage succeeding a local unit is known (for example, see the above described Japanese Published Unexamined Patent Application No. 2002-140139 and the above described Japanese Registered Patent Publication No. 3538366).

With such a mechanism for automatically moving the termination position of a bus according to a connection of units, a problem of making multiple terminations, and a problem of missing a termination can be avoided. However, if a unit is added by using this mechanism, the unit must be added at the end of a bus, or must be interposed by once interrupting a bus. Namely, also with this mechanism, a user must assemble a microscope system by connecting units in consideration of their interconnections so that both ends of a bus are properly terminated. Therefore, the degree of difficulty of the assembly operations is still high. Additionally, since there are not a few cases where a combination of units is changed according to an intended use in a microscope system, a connection error can be possibly caused during the repetitions of an assembly.

SUMMARY OF THE INVENTION

A microscope system in one aspect of the present invention comprises at least an intra-system bus line for transmitting control data for controlling the operations of the microscope system, a switch connected in series to the intra-system bus line at some point on the intra-system bus line, an extension connector to which an extension unit, which comprises at least a processing device for transmitting/receiving the control data, and an intra-unit bus line that the processing device uses to transmit/receive the control data, is connected, and a detecting unit for detecting whether or not the extension unit is connected to the extension connector, and for opening/closing the switch based on a result of the detection. The switch releases the intra-system bus line at the position of the switch when being opened, or connects the intra-system bus line at the position of the switch when being closed, the intra-system bus line is led from both sides of the switch to the extension connector, and connected via the intra-unit bus line if the extension unit is connected to the extension connector, and the detecting unit opens the switch if detecting that the extension unit is connected to the extension connector, or closes the switch if detecting that the extension unit is not connected to the extension connector.

BRIEF DESCRIPTION OF THE DRAWINGS

The present invention will be more apparent from the following detailed description when the accompanying drawings are referenced.

FIG. 1 shows a first example of the principle of a configuration of a microscope system for implementing the present invention;

FIG. 2A shows the details of a configuration of a fixed unit in FIG. 1;

FIG. 3 shows the principle of a configuration of a detecting unit;

DESCRIPTION OF THE PREFERRED EMBODIMENTS

Figure 2B:
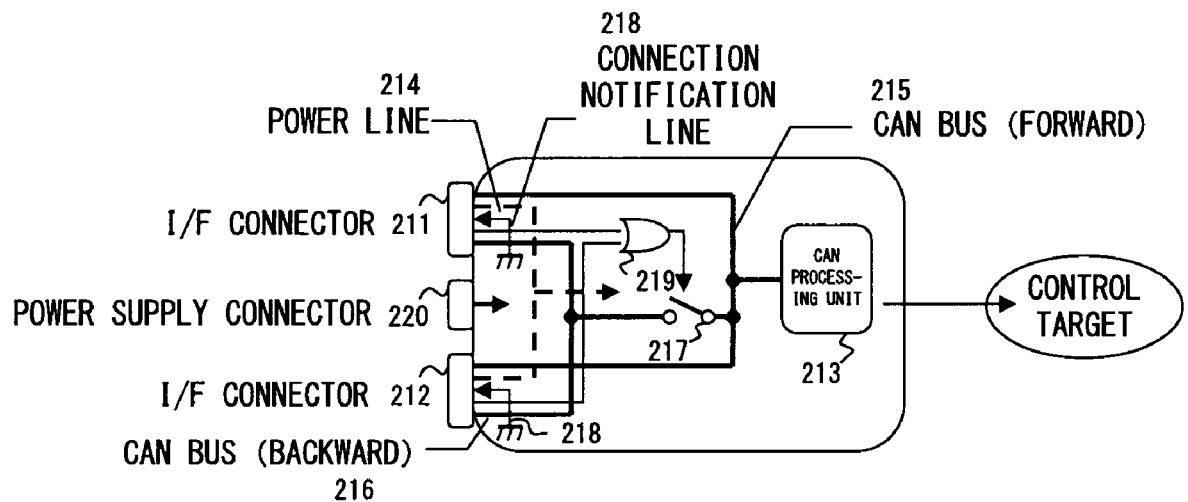
FIG. 2B shows the details of a configuration of an extension unit in FIG. 1.

Preferred embodiments according to the present invention are hereinafter described with reference to the drawings.

FIG. 1 is described first. This figure shows a first example of the principle of a configuration of a microscope system for implementing the present invention. This microscope system adopts a CAN interface for the transmission/reception of various types of data required among component units in order to electrically control the switching and the driving operations of various types of members. FIG. 1 schematically shows the connections of units to a CAN bus in this microscope system.

Each of CAN buses L1, L2, L3, L4-F, L4-B, L5-F, L5-B, L6-F, L6-B, L7, L8-F, L8-B, L9-F, and L9-B is actually multiple lines including at least a CAN line, which is a two-wire (twisted pair cable) bus line, although each of them is depicted as one line in FIG. 1. Additionally, a power supply line LP indicated by one broken line in FIG. 1 is actually composed of a power supply line and a ground (ground potential) line.

Fixed units 2 and 10 are functional units essential to the microscope system. In this preferred embodiment, the fixed unit 2 comprises an operation switch, which exists in the main body of the microscope, as a control target, whereas the fixed unit 10 comprises a controlling unit for a power supply, which supplies power to the constituent elements of the microscope system, as a control target.

Details of the configuration of a fixed unit are shown in FIG. 2A.

3 connectors are provided in the fixed unit. 2 connection terminals of I/F connectors 201 and 203 among the 3 connectors are interconnected with a two-wire CAN bus 200.

The CAN bus 200 is connected also to a CAN processing unit 204. The CAN processing unit 204 comprises a CAN transceiver for managing the transmission/reception of various types of data, which are made via the CAN bus 200, a CAN controller for converting/inversely converting various types of data into a CAN data format, and a CPU (Central Processing Unit), which is a processing device for controlling the control target of the fixed unit, although these constituent elements are not shown in FIG. 2A.

A power supply connector 202, which is another connector provided in the fixed unit, is a connector to which the power supply line LP for supplying power to the units configuring the microscope system is connected. The CAN processing unit 204 and the control target of the fixed unit are operated by power applied to the power supply connector 202.

Also connection notification lines 205 for notifying an adjacent unit of a connection state are connected to other connection terminals of the I/F connectors 201 and 203. The connection notification lines 205 are grounded (connected to ground potentials) within the fixed unit. Other units, which are connected via the I/F connectors 201 and 203, use the connection notification lines 205 in order to detect their connections to this fixed unit.

Here, the principle of the configuration of a detecting unit for detecting whether or not another unit is connected via an I/F connector is shown in FIG. 3.

In FIG. 3, when a unit A 301 and a unit B 302 are connected with an I/F connector via a cable, input signals to detecting circuits 311 and 312 are driven to "L" level respectively. If the input signals are "L" level, the detecting circuits 311 and 312 output a detection result that another unit is connected to an I/F connector as a detection target. In the meantime, if the unit A 301 and the unit B 302 are disconnected, the input signals to the detecting circuits 311 and 312 are respectively driven to "H" level due to the actions of pull-up resistors 321 and 322. If the input signals are "H" level, the detecting circuits 311 and 312 output a detection result that another unit is not connected to the I/F connector as the detection target.

The fixed unit is configured as described above. Note that the CAN bus 200 is connected to connection terminals as a forward bus (to be described later) in the entire microscope system among the connection terminals of the I/F connectors 201 and 203.

Referring back to FIG. 1. Extension units 4, 5, 6, 8, and 9 are units comprising various types of optical elements, an operation switch, a driving mechanism, etc., which configure the microscope system, as control targets, and are units that a user can arbitrarily attach/detach to/from the microscope system according to an observation method.

Details of the configuration of the extension unit are shown in FIG. 2B.

Also the extension unit comprises I/F connectors 211 and 212 similar to the fixed unit. 2 connection terminals of the I/F connectors 211 and 212 are interconnected with a two-wire CAN bus 215. Also a CAN microcomputer unit 213 that is similar to the fixed unit is connected to the CAN bus 215. Additionally, connection notification lines 218 for notifying an adjacent unit of a connection state are connected to other connection terminals of the I/F connectors 211 and 212, similar to the fixed unit.

As a characteristic point in this extension unit, 2 other connection terminals of the I/F connectors 211 and 212 are interconnected with another CAN bus 216. Here, the CAN bus 215 is used as a forward bus (CAN-F) in the CAN bus that goes around the entire microscope system, whereas the CAN bus 216 is used as a backward bus (CAN-B) in the CAN bus that goes around the entire microscope system.

The extension unit also comprises a bus connection switch 217. The bus connection switch 217 is actually a switch of two circuits. This switch connects or releases the forward CAN bus 215 and the backward CAN bus 216, which are two-wire lines, for each line. The switching of the bus connection switch 217 is made according to the logic of the output signal of an OR circuit 219. 2 input terminals of the OR circuit 219 are respectively connected to the connection terminals of the I/F connectors 211 and 212, to which the connection notification lines of other units connected to the I/F connectors 211 and 212 are connected. Namely, the OR circuit 219 functions as the detecting circuits (311 and 312) in FIG. 3. That is, the OR circuit 219 opens the bus connection switch 217 by driving the output signal to "L" level only if other units are connected to both of the I/F connectors 211 and 212, so that the connection between the forward CAN bus 215 and the backward CAN bus 216 is released.

2 other connection terminals of the I/F connectors 211 and 212 in the extension unit are connected with a power line 214 that is composed of a power supply line and a ground line. The CAN processing unit 213 and the control target of the extension unit are operated with power transmitted from either of the I/F connectors 211 and 212 to the power line 214. Additionally, the power transmitted from either of the I/F connectors 211 and 212 is transmitted also to the other of the I/F connectors 211 and 212 via the power line 214. Accordingly, also the unit connected to that connector is operated with this power. However, for example, if power consumption in the control target of the extension unit is high, a power supply connector 220 may be provided in the extension unit, and the CAN microcomputer unit 213 and the control target of the extension unit may be operated with power applied to the power supply connector 220. The extension unit 8 shown in FIG. 1 exactly has such a configuration.

Referring back to FIG. 1. Extension ports 1, 3, and 11 are circuits having a function to terminate the end of the CAN bus that goes around the microscope system, and a function to form a detour of the CAN bus in this preferred embodiment.

Details of the configuration of an extension port are shown in FIG. 2.

4 connectors are provided in the extension port. Here, an extension connector 224 is a connector having a structure that is similar to I/F connectors 221 and 223. 2 connection terminals for the forward bus of the I/F connector 221, and 2 connection terminals for the forward bus of the extension connector 224 are interconnected with a two-wire forward CAN bus 225. Additionally, 2 connection terminals for the forward bus (not for the backward bus) of the I/F connector 223, and 2 connection terminals for the backward bus of the extension connector 224 are interconnected with a two-wirer backward CAN bus 226. Furthermore, connection notification lines 230 for notifying an adjacent unit of a connection state are connected to other connection terminals of the I/F connectors 221 and 223.

Additionally, the extension port comprises a bus connection switch 228. Also the bus connection switch 228 is actually a switch of 2 circuits, similar to that of the extension unit. This switch connects or releases the forward CAN bus 225 and the backward CAN bus 226, which are two-wire lines, for each line. The switching of the bus connection switch 228 is made according to the logic of the signal of the connection notification line 229. Namely, the logic of the signal of the connection notification line 229 is driven to "L" level if another unit is connected to the extension connector 224. At this time, a detecting circuit similar to FIG. 3 (not shown in FIG. 2C) opens the bus connection switch 228, so that the forward CAN bus 225 and the backward CAN bus 226 are released. In the meantime, if another unit is not connected to the extension connector 224, the logic of the signal of the connection notification line 229 is driven to "H" level. At this time, the detecting circuit closes the bus connection switch 228, so that the forward CAN bus 225 and the backward CAN bus 226 are connected.

Furthermore, the extension port comprises termination resistors 231 and 232.

The termination resistor 231 is arranged on the forward CAN bus 225 between the I/F connector 221 and the bus connection switch 228, and terminates the lines of the two-wirer forward CAN bus 225 if another unit is not connected to the I/F connector 221. Namely, the logic of the signal of the connection notification line 233 is driven to "L" level if another unit is connected to the I/F connector 221. At this time, a detecting circuit (not shown in FIG. 2C) similar to that of FIG. 3 terminates the lines of the forward CAN bus 225 by connecting the termination resistor 231 to the forward CAN bus 225. Or, if another unit is not connected to the I/F connector 221, the logic of the signal of the connection notification line 233 is driven to "H" level. At this time, the detecting circuit does not terminate the forward CAN bus by releasing the termination resistor 231 from the forward CAN bus 225.

In the meantime, the termination resistor 232 is arranged on the backward CAN bus 227 between the I/F connector 223 and the bus connection switch 228, and terminates the lines of the two-wirer backward CAN bus 226 if another unit is not connected to the I/F connector 223. Namely, the logic of the signal of the connection notification line 234 is driven to "L" level if another unit is connected to the I/F connector 223. At this time, a detecting circuit (not shown in FIG. 2C) similar to that of FIG. 3 terminates the lines of the backward CAN bus 226 by connecting the termination resistor 232 to the backward CAN bus 226. Or, the logic of the signal of the connection notification line 234 is driven to "H" level if another unit is not connected to the I/F connector 223. At this time, the detecting circuit does not terminate the backward CAN bus 226 by releasing the termination resistor 232 from the backward CAN bus 226.

A power supply connector 222, which is another connector provided in the extension port, is a connector to which the power supply line LP for supplying power to the units configuring the microscope system is connected. The switching operation of the bus connection switch 228, and the insertion/extraction operation of the termination resistors 231 and 232 in the extension port are operated with power applied to the power supply connector 222. The power applied to the power supply connector 222 is also led to an extension connector 224 via a power line 227, and also supplied to another unit connected to the extension connector 224. With this configuration, also power required by the respective units can be together supplied with an interconnection.

Referring back to FIG. 1. A power supply source 12 supplies power to the units, which configure the microscope system shown in FIG. 1, via the power supply line LP. Additionally, a power supply source 7 is provided exclusively for the extension unit 8 the power consumption of which is assumed to be significantly high in this preferred embodiment.

Described next is a state where a CAN interface for transmitting/receiving various type of data among the component units is configured in the microscope system shown in FIG. 1.

The extension port 1 is arranged in a component essential to the microscope system, and responsible for terminating one end of the CAN bus (intra-system bus line) that goes around the microscope system.

Since another unit is not connected to an I/F connector 13 in the extension port 1, a termination resistor 14 is connected to a forward CAN bus within the extension port 1 by the action of the above described connection notification line. Additionally, because another unit is not connected also to an extension connector 19, a bus connection switch 15 is closed by the action of the above described connection notification line, so that the forward and the backward CAN buses within the extension port 1 are connected. This backward CAN bus is connected to the external CAN bus L1 via an I/F connector 16. As a result, a termination resistor 14 becomes one end of the CAN bus that goes around the microscope system. Since the fixed unit 2 is connected to the I/F connector 16 in the extension port 1 via the CAN bus L1, a termination resistor 17 is released from the backward CAN bus within the extension port 1 by the action of the above described connection notification line.

The operating power of the extension port 1 is supplied by the power supply source 12 from a power supply connector 18 via the power supply line LP.

The fixed unit 2 connects the CAN bus L1, which is connected to an I/F connector 21, and the CAN bus L2, which is connected to an I/F connector 22, with a CAN bus within the fixed unit 2. The operating power of the fixed unit 2 is supplied by the power supply source 12 from a power supply connector 23 via the power supply line LP.

In the extension port 3, the fixed unit 2 is connected to an I/F connector 31 via the CAN bus L2, and the fixed unit 10 is connected to an I/F connector 32 via the CAN bus L3. Therefore, both of the termination resistors 33 and 34 do not terminate the buses. Additionally, since the extension unit 4 is connected to an extension connector 35, a bus connection switch 36 is opened, so that the forward and the backward CAN buses within the extension port 3 are released. Accordingly, the CAN bus L2 connected to the I/F connector 31 is drawn to the forward CAN bus L4-F via the forward CAN bus within the extension port 3, and the extension connector 35.

The operating power of the extension port 3 is supplied by the power supply source 12 from a power supply connector 37 via the power supply line LP. However, part of the power supplied to the power supply connector 37 is drawn from the extension connector 35.

In the extension unit 4, the extension port 3 is connected to an I/F connector 41, and the extension unit 5 is connected to an I/F connector 43. Therefore, a bus connection switch 42 is opened. Accordingly, the forward CAN bus L4-F, which is connected to the I/F connector 41, is connected to the forward CAN bus L5-F, which is connected to the I/F connector 43, via a forward CAN bus within the extension unit 4.

The operating power of the extension unit 4 is supplied from a power supply connector 37 of the extension port 3 via the I/F connector 41. Part of the power applied to the I/F connector 41 is drawn from the I/F connector 43 via a power line within the extension unit 4.

The connection state of the extension unit 5 is similar to the extension unit 4. Therefore, the forward CAN bus L5-F, which is connected to an I/F connector 51, is connected to the forward CAN bus L6-F, which is connected to an I/F connector 53, via a forward CAN bus within the extension unit 5. The operating power of the extension unit 5 is supplied from the I/F connector 43 of the extension port 4 via the I/F connector 51, and part of the power is drawn from the I/F connector 53 via a power line within the extension unit 5.

In the extension unit 6, another unit is not connected to an I/F connector 63 although the extension port 5 is connected to an I/F connector 61. Therefore, a bus connection switch 62 is closed. Accordingly, the forward CAN bus L6-F, which is connected to the I/F connector 61, is connected to the backward CAN bus L6-B, which is connected to the I/F connector 61, via a forward CAN bus, the bus connection switch 62, and a backward CAN bus within the extension unit 6. The operating power of the extension unit 6 is supplied from the I/F connector 53 of the extension port 5 via the I/F connector 61.

As described above, both the bus connection switch 52 of the extension unit 5, and the bus connection switch 42 of the extension unit 4 are opened. Accordingly, the backward CAN bus L6-B, which is connected to the I/F connector 53 of the extension unit 5, is connected to the backward CAN bus L5-B, which is connected to the I/F connector 51 of the extension unit 5, via the backward CAN bus within the extension unit 5, and further connected to the backward CAN bus L4-B, which is connected to the I/F connector 41, via the I/F connector 43 of the extension unit 4, and the backward CAN bus within the extension unit 4.

Additionally, since the bus connection switch 36 within the extension port 3 is opened as described above, the backward CAN bus L4-B, which is connected to the extension connector 35 of the extension port 3, is connected to the CAN bus L3, which is connected to the I/F connector 32, via the backward CAN bus within the extension port 3.

In the fixed unit 10, the CAN bus L3, which is connected to an I/F connector 101, and the CAN bus L7, which is connected to an I/F connector 102, are connected with a CAN bus within the fixed unit 10. The operating power of the fixed unit 10 is supplied by the power supply source 12 from a power supply connector 103 via the power supply line LP.

In the extension port 11, the fixed unit 10 is connected to an I/F connector 111 via the CAN bus L7. Therefore, a termination resistor 115 does not terminate a forward CAN bus within the extension port 11. Additionally, since the extension unit 9 is connected to an extension connector 114, a bus connection switch 117 is opened, so that forward and backward CAN buses within the extension port 11 are released. Accordingly, the CAN bus L7, which is connected to the I/F connector 111, is drawn to the forward CAN bus L8-F via the forward CAN bus within the extension port 11, and the extension connector 114.

The operating power of the extension port 11 is supplied by the power supply source 12 from a power supply connector 113 via the power supply line LP. However, part of the power supplied to the power supply connector 113 is drawn from the extension connector 114.

Subsequently, the forward CAN bus L8-F is connected to the forward CAN bus L9-F via the extension unit 9, and connected to the backward CAN bus L9-B after being folded back by the extension unit 8. Thereafter, the forward CAN bus is connected to the backward CAN bus L8-B via the extension unit 9. Operations of the extension units 8 and 9 in this portion are similar to those of the above described extension units 5 and 6.

The extension port 11 is arranged in an essential component within the microscope system, similar to the extension port 1, and responsible for terminating one end of the CAN bus that goes around the microscope system.

Because the bus connection switch 117 within the extension port 11 is opened as described above, forward CAN and backward CAN buses within the extension port 11 are released. In the meantime, another unit is not connected to an I/F connector 112. Therefore, a termination resistor 116 is connected to the backward CAN bus within the extension port 11. Accordingly, the backward CAN bus L8-B, which is connected to an extension connector 114, is terminated by the termination resistor 116 via the backward CAN bus within the extension port 11. As a result, the termination resistor 116 becomes the other end of the CAN bus that goes around the microscope system.

As described above, the CAN bus in the microscope system shown in FIG. 1 is configured as one two-wire transmission line that starts at the termination resistor 14 within the extension port 1, passes through the CAN bus L1, the fixed unit 2, the CAN bus L2, the extension port 3, the forward CAN bus L4-F, the extension unit 4, the forward CAN bus L5-F, the extension unit 5, the forward CAN bus L6-F, the extension unit 6, the backward CAN bus L6-B, the extension unit 5, the backward CAN bus L5-B, the extension unit 4, the backward CAN bus L4-B, the extension port 3, the CAN bus L3, the fixed unit 10, the CAN bus L7, the extension port 11, the forward CAN bus L8-F, the extension unit 9, the forward CAN bus L9-F, the extension unit 8, the backward CAN bus L9-B, the extension unit 9, and the backward CAN bus L8-B in this order, and is terminated by the termination resistor 116 within the extension port 11.

Here, the configuration of the extension port 3 in the microscope system shown in FIG. 1 is focused.

The bus connection switch 36 is connected in series to a CAN bus at some point on the CAN bus that transmits control data for controlling the operations of the microscope system. This switch releases the CAN bus at the position of the switch when being opened, or connects the CAN bus at the position of the switch when being closed.

Additionally, the CAN bus is led from both sides of the bus connection switch 36 to the extension connector 35. Here, if the extension unit 4 is connected to the extension connector 35 when a bus connection switch 42 is closed, the CAN bus is connected via a bus line within the extension unit 4.

A detecting circuit, which is provided in the extension port 3 and not shown (see FIG. 3), is intended to detect whether or not the extension unit 4 is connected to the extension connector 35. Here, the detecting circuit performs an operation for opening the bus connection switch 36 if detecting that the extension unit 4 is connected to the extension connector 35, or performs an operation for closing the bus connection switch 36 if detecting that the extension unit 4 is not connected to the extension connector 35.

The bus connection switches 15 and 117, the extension connectors 19 and 114, and the detecting circuits not shown, which are respectively provided in the extension ports 1 and 11, have characteristics similar to those of the extension port 3.

The extension unit 4 in the microscope system shown in FIG. 1 is focused next.

The extension unit 4 comprises at least (a CAN processing unit comprising) a CPU that transmits/receives control data for controlling the operations of the microscope system, and a forward CAN bus that the CPU uses to transmit/receive the control data. Here, if the extension unit 4 is connected to the extension connector 35 of the extension port 3, the CAN bus, which is led from both sides of the bus connection switch 36 to the extension connector 35, is connected via the forward CAN bus.

Additionally, the bus connection switch 42 within the extension unit 4 is connected in series to the CAN bus at some point on the CAN bus. This switch releases the CAN bus at the position of the switch when being opened, or connects the CAN bus at the position of the switch when being closed.

Furthermore, the CAN bus is led from both sides of the bus connection switch 42 to an I/F connector 43. Here, if the extension unit 5 is connected to the I/F connector 43 when a bus connection switch 52 is closed, the CAN bus is connected via a bus line within the extension unit 5.

A detecting circuit (the OR circuit 219 in FIG. 2B), which is provided in the extension unit 4 and not shown, detects whether or not the extension unit 4 is connected to the extension connector 35 comprised by the extension port 3, and whether or not the extension unit 5 is connected to the I/F connector 43. Here, the detecting circuit performs an operation for opening the bus connection switch 42 if detecting that the extension unit 4 is connected to the extension connector 35, and that the extension unit 5 is connected to the I/F connector 43, or performs an operation for closing the bus connection switch 42 otherwise.

The bus connection switches 52, 62, 82, and 92, the I/F connectors 53, 63, 83, and 93, and the detecting circuits not shown, which are respectively provided in the extension units 5, 6, 8, and 9, have characteristics similar to those of the extension unit 4.

Namely, each of the units once relays and returns part of the CAN bus, and if a unit is connected in the succeeding stage, each of the units opens the CAN bus and passes the CAN bus to a succeeding stage. This can significantly reduce the occurrence rate of problems of system operations due to an assembly error, etc. even if the microscope system is assembled without being conscious of the positions of units, their connection order, and the like at all. Accordingly, an effective method for applying a CAN bus to a microscope system can be provided.

Figure 2C:
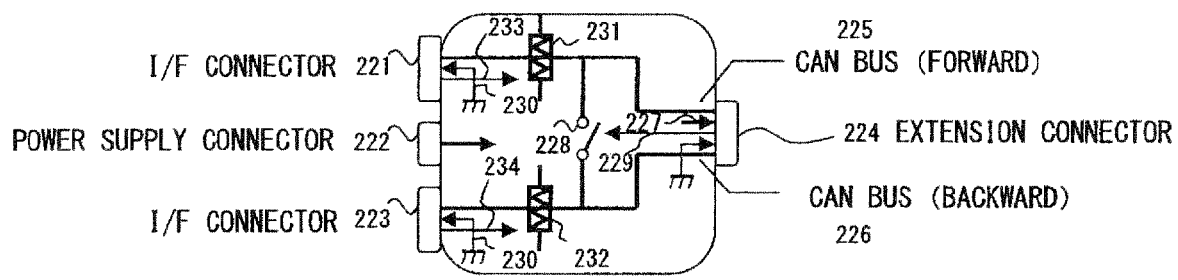
FIG. 2C shows the details of a configuration of an extension port in FIG. 1.

As the extension connector 224 of the extension port shown in FIG. 2C, the same connector as the I/F connectors 211 and 212 of the extension unit shown in FIG. 2B is used. Accordingly, the extension connector 224, and the I/F connectors 211 and 212 can be arbitrarily combined and connected in the microscope system shown in FIG. 1. Namely, an I/F connector of an extension unit attached/detached to/from the microscope system according to an intended use is connected to an empty connector, to which no unit is connected, among extension connectors of an extension port, which are provided in the microscope system beforehand, and the extension unit is merely connected in series depending on need, whereby the CAN processing unit of the extension unit can be connected to a CAN bus without interrupting the CAN bus that goes around the entire microscope system.

Additionally, even if an extension unit is detached from the microscope system, forward and backward CAN buses are connected by a bus connection switch that is comprised by an extension unit or an extension port in a stage preceding the detached unit. Therefore, the CAN bus that goes around the entire microscope system is maintained.

For example, if the extension units 4, 5, and 6 are detached from the extension port 3, and the extension units 8 and 9 are detached from the extension port 11 in the configuration shown in FIG. 1, both the bus connection switch 36 of the extension port 3 and the bus connection switch 117 of the extension port 11 are closed. In this case, the CAN bus in the microscope system shown in FIG. 1 is configured as one two-wire transmission line that starts at the termination resistor 14 within the extension port 1, passes through the CAN bus L1, the fixed unit 2, the CAN bus L2, the extension port 3, the CAN bus L3, the fixed unit 10, and the CAN bus L7 in this order, and is terminated by the termination resistor 116 within the extension port 11.

A connection order and a connection position in the attachment/detachment of an extension unit are arbitrary. Furthermore, both ends of the CAN bus are always terminated by termination resistors in extension ports within components essential to the microscope system. Therefore, it is unnecessary to be conscious of terminating the CAN bus in the attachment/detachment operation of an extension unit.

In FIG. 1, a fixed unit and an extension port are implemented as separate constituent elements. However, the unit and the port may be integrated.

Figure 4:
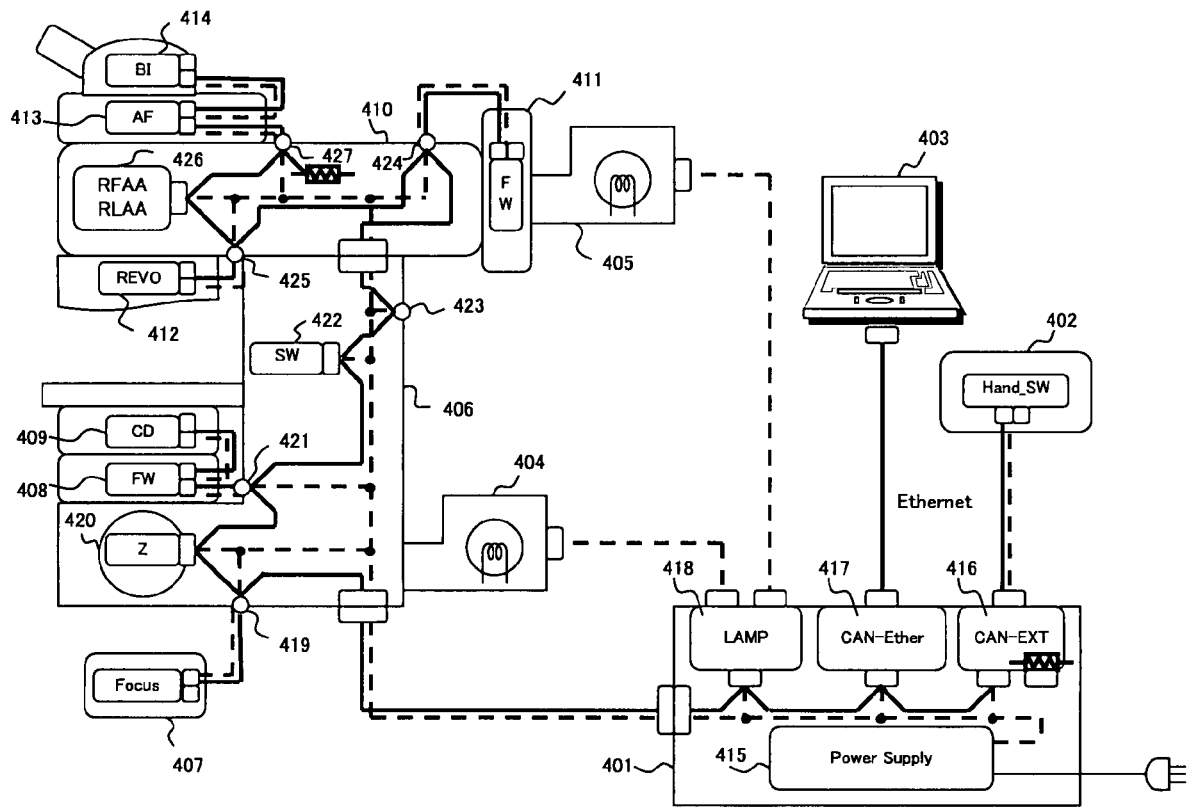
FIG. 4 shows a specific configuration example of a microscope system to which the principle of the configuration shown in FIG. 1 is applied.

FIG. 4 is described next. This figure shows a specific configuration example of a microscope system to which the principle of the configuration shown in FIG. 1 is applied.

In FIG. 4, a system power supply source 401 is a component for supplying the total power of the microscope system, and essential to the microscope system. A power supply 415 for converting commercial power into a power supply voltage used within the microscope system, a lamp controlling unit 418 for controlling illumination for observing the microscope, and a protocol converting unit 417 for managing a data transmission/reception by providing an interface with a host computer 403 that externally controls the system are incorporated in the system power supply source 401. Here, the lamp controlling unit 418 and the protocol converting unit 417 are equivalent to fixed units in the above described principle of the configuration. Also an extension port 416, which has a function to terminate a CAN bus and a function to form a detour of a CAN bus, is incorporated in the system power supply source 401. In the configuration example shown in FIG. 4, one end of the CAN bus, which goes around the microscope system, is terminated by this extension port 416.

A hand switch 402 is an input device used when a user operates the microscope system with a button operation, etc., and equivalent to an extension unit in the above described principle of the configuration.

The host computer 403 stores application software, which has a function to control the microscope and a function to process data, in an internal storage device. A user can efficiently operate the microscope system by causing the application software to be executed on the host computer 403. In the host computer 403, so-called Ethernet (registered trademark) is used for a data communication with the microscope system, and the protocol converting unit 417 converts a communications protocol, whereby a communication message can be transmitted/received to/from the CAN bus within the microscope system.

A transmitted illumination lamp house 404 and an epi-illumination lamp house 405 are light sources that are selected and used according to an observation method. The transmitted illumination lamp house 404 is directly attached to a microscope main body 406, whereas the epi-illumination lamp house 405 is attached to a floodlight tube 410. ON/OFF and the dimming of the transmitted illumination lamp house 404 and the epi-illumination lamp house 405 are respectively controlled by the lamp controlling unit 418.

A switch unit 422 on which various types of switches for operations are arranged, and a focusing unit 420 for achieving a focus in the microscope system are incorporated in the microscope main body 406. Also extension ports 419, 421, and 423, which have the function to terminate a CAN bus and the function to form a detour of a CAN bus, are incorporated in the microscope main body 406. Both the switch unit 422 and the focusing unit 420 are equivalent to fixed units in the above described principle of the configuration.

A focus handle 407 is an input device in which a handle for operating an instruction to achieve a focus in the microscope system, and switches for operating instructions to switch between coarse and fine focusing when a focus is adjusted, to retract a stage, and to restore to an observation position are arranged. This handle is equivalent to an extension unit.

Filter wheels 408 and 411 are components that can selectively insert/extract an arbitrary optical filter in/from an illumination optical system, and equivalent to extension units.

A condenser 409 is a component having a plurality of condensers (light collectors) that can be selectively inserted/extracted in/from the illumination optical system, and equivalent to an extension unit.

The floodlight tube 410 comprises an aperture stop and a field stop, and can selectively insert/extract an arbitrary filter cube in/from an optical path according to an observation method such as a brightfield, a darkfield, differential interference, etc. This floodlight tube 410 is a component essential to the microscope system. A floodlight tube controlling unit 426, which is equivalent to a fixed unit, is incorporated in the floodlight tube 410. Also extension ports 424, 425, and 427, which have the function to terminate a CAN bus and the function to form a detour of a CAN bus, are incorporated. In the configuration example shown in FIG. 4, the other end of the CAN bus, which goes around the microscope system, is terminated by the extension port 427.

A revolver 412 holds a plurality of objective lenses of different magnification factors, and is a unit that can insert/extract an arbitrary objective lens in/from an observation optical path by being rotated. The revolver 412 is equivalent to an extension unit.

An AF (Auto Focus) 413 is a unit for performing an operation for achieving the focus of an objective lens selected for an observation sample of the microscope, and equivalent to an extension unit.

An eyepiece lens barrel 414 is a unit that leads observation light to an eyepiece lens or a TV camera port not shown by splitting the light with a beam splitter, and obtains information about the image of an observation sample. This unit is equivalent to an extension unit.

The microscope system shown in FIG. 4 is configured as an assembly of the above described units. The configuration of the CAN bus, which goes around this microscope system, is described next.

One end of the CAN bus exists in the extension port 416 within the system power supply source 401. A termination resistor is connected within the extension port 416, and the CAN bus is terminated there. The CAN bus that starts at the extension port 416 is externally drawn from the extension port 416, and led to the hand switch 402 as the forward CAN bus.

Although the hand switch 402 is the extension unit, another unit is not connected to one of the 2 I/F connectors. Therefore, the forward and the backward CAN buses are connected within the hand switch 402. Accordingly, the CAN bus returns to the extension port 416 within the system power supply source 401. Thereafter, the CAN bus is led to the microscope main body 406 after passing through the protocol converting unit 417 and the lamp controlling unit 418, which are the fixed units.

Within the microscope main body 406, the CAN bus is externally drawn by being led by an extension port 419, and led to the focus handle 407 as the forward CAN bus. Since other units are connected to both of 2 I/F connectors in the extension port 419, the termination of the CAN bus does not function.

Although the focus handle 407 is the extension unit, another unit is not connected to one of the 2 I/F connectors, similar to the above described hand switch 402. Therefore, the CAN bus returns to the extension port 419 within the microscope main body 406.

Then, the CAN bus is drawn out as the forward CAN bus from the extension port 421 to the filter wheel 408 after passing through the focusing unit 420 that is the fixed unit. Since other units are connected to both of 2 I/F connectors also in the extension port 421, the termination of the CAN bus does not function.

Because other units are connected to both of 2 I/F connectors in the filter wheel 408 that is the extension unit, the forward and the backward CAN buses are internally separated. Accordingly, the forward CAN bus is led from the filter wheel 408 to the condenser 409. In the meantime, another unit is not connected to one of 2 I/F connectors in the condenser 409 that is the extension unit. Therefore, the forward and the backward CAN buses are connected within the condenser 409. In the meantime, the forward CAN bus becomes the backward CAN bus, and returns from the extension port 421 to the microscope main body 406 via the filter wheel 408.

Then, the CAN bus is connected to the extension port 423 after passing through the switch unit 422 that is the fixed unit.

Since an extension unit is not connected to an extension connector in the extension port 423, the forward and the backward CAN buses are connected within the extension port 423. Additionally, because other units are connected to 2 I/F connectors in the extension port 423, the termination of the CAN bus does not function. Accordingly, the CAN bus passes through the extension port 423 unchanged, and is led to the floodlight tube 410.

In the floodlight tube 410, the CAN bus is drawn from the extension port 424 to the filter wheel 411 again as the forward CAN bus. Since other units are connected to both of 2 I/F connectors also in the extension port 424, the termination of the CAN bus does not function.

Because another unit is not connected to one of 2 I/F connectors in the filter wheel 411 that is the extension unit, the CAN bus returns to the extension port 424 within the floodlight tube 410, and is led to the extension port 425.

Thereafter, the CAN bus is drawn from the extension port 425 to the revolver 412 again as the forward CAN bus. Since another unit is not connected to one of 2 I/F connectors in the revolver 412 that is the extension unit, the CAN bus returns to the extension port 425 within the floodlight tube 410.

Then, the CAN bus is drawn from the extension port 427 to the AF 413 as the forward CAN bus after passing through the floodlight tube controlling unit 426 that is the fixed unit.

Since other units are connected to both of 2 I/F connectors in the AF 413 that is the extension unit, the forward and the backward CAN buses are internally separated. Accordingly, the forward CAN bus is led from the AF 413 to the eyepiece lens barrel 414. In the meantime, another unit is not connected to one of 2 I/F connectors in the eyepiece lens barrel 414 that is the extension unit. Therefore, the forward and the backward CAN buses are connected within the eyepiece lens barrel 414. Accordingly, the forward CAN bus becomes the backward CAN bus, and returns to the extension port 427 via the AF 413.

Since another unit is not connected to one of 2 I/F connectors in the extension port 427, the termination of the CAN bus functions, and a termination resistor is connected to the CAN bus. Accordingly, the other end of the CAN bus, which goes around the microscope system, becomes this extension port 427.

As described above, the microscope system shown in FIG. 4 adopts the basic configuration where the terminations of the CAN bus are fixed to the system power supply source 401 and the floodlight tube 410, which are the components essential to the system, and the plurality of extension ports are arranged in the system power supply source 401, the microscope main body 406, and the floodlight tube 410. With this configuration, a user can secure a line for a data communication within the system only by performing an operation for connecting components, which are equivalent to extension units, to the I/F connectors or the extension connectors of extension ports, or to the I/F connectors of extension units with the use of the above described components as a base without giving technical consideration to the construction of the CAN bus.

The number and the positions of extension ports provided in each of the components in the microscope system shown in FIG. 4 are merely examples, and not limited to these implementations. Also the connection positions and the connection order of the units are not limited to the implementations of FIG. 4.

As described above, with the microscope system according to this preferred embodiment, the wiring savings, and the degree of freedom of an assembly of the microscope system can be improved, and at the same time, the number of occurrences of problems of system operations due to an assembly error, etc. can be reduced. Additionally, a CAN bus can be effectively applied to the microscope system.

Figure 5:
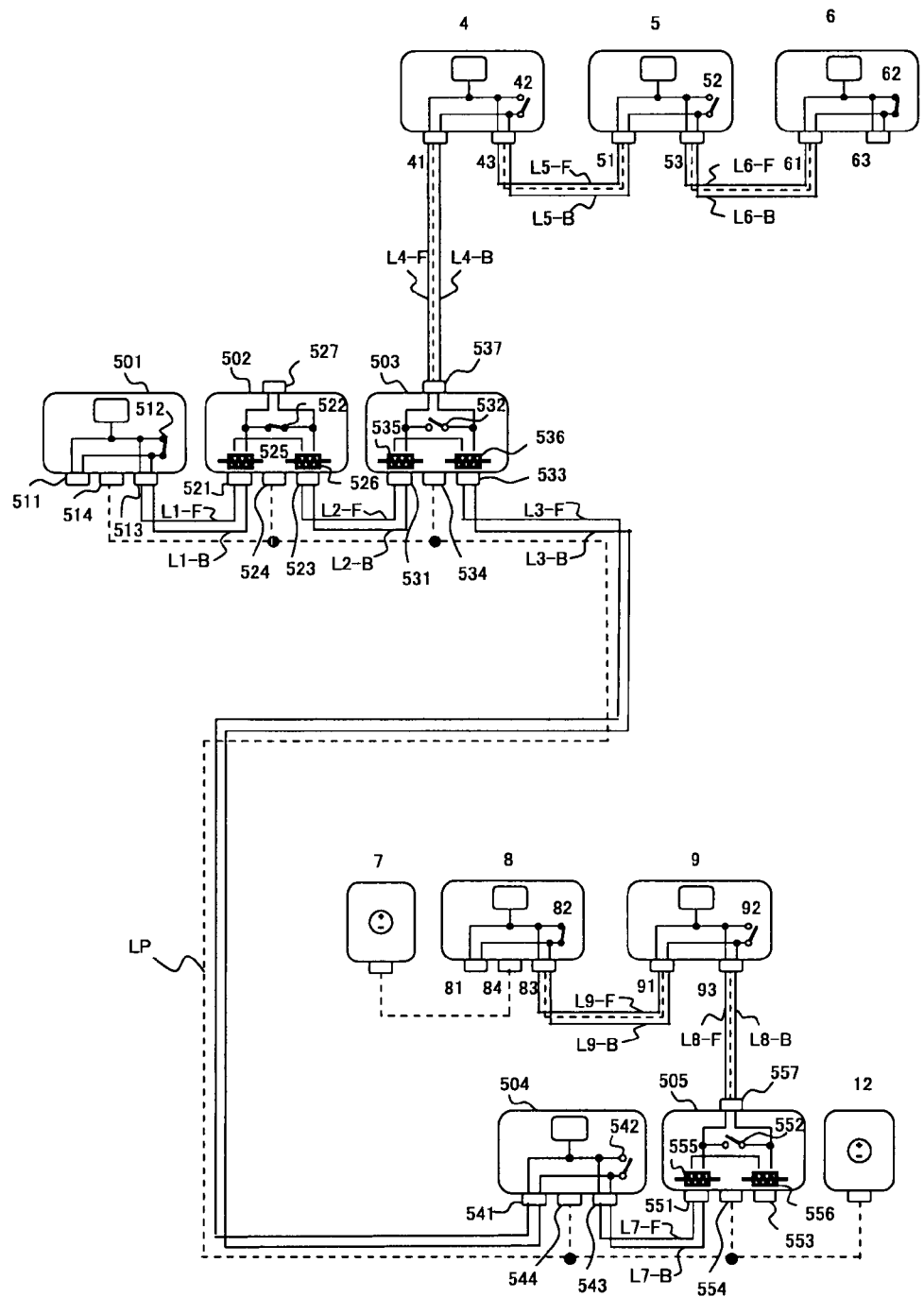
FIG. 5 shows a second example of the principle of the configuration of the microscope system for implementing the present invention.

FIG. 5 is described next. This figure shows a second example of the principle of the configuration of the microscope system for implementing the present invention. In FIG. 5, the same constituent elements as those in the first example shown in FIG. 1 are denoted with the same reference numerals.

The second example shown in FIG. 5 has a significant difference from the first example shown in FIG. 1 in a point that forward and backward buses are provided for the entire CAN bus that goes around the microscope system, and the terminations of the CAN bus are made within a single extension port in the system.

In FIG. 5, although each of CAN buses L1-F, L1-B, L2-F, L2-B, L3-F, L3-B, L4-F, L4-B, L5-F, L5-B, L6-F, L6-B, L7-F, L7-B, L8-F, L8-B, L9-F, and L9-B is depicted as one line, each of them is actually multiple lines including at least a CAN line that is a two-wire (twisted pair cable) bus line. Additionally, a power supply line LP indicated by one broken line in FIG. 5 is actually composed of a power supply line and a ground (ground potential) line.

In FIG. 5, units 501 and 504 are fixed units, units 502, 503, and 505 are extension ports, and units 4, 5, 6, 8, and 9 are extension units. A power supply source 12 supplies power to the units, which configure the microscope system shown in FIG. 5, via the power supply line LP, whereas a power supply source 7 is provided exclusively for the extension unit 8 the power consumption of which is assumed to be significantly high in this preferred embodiment.

Figure 6A:
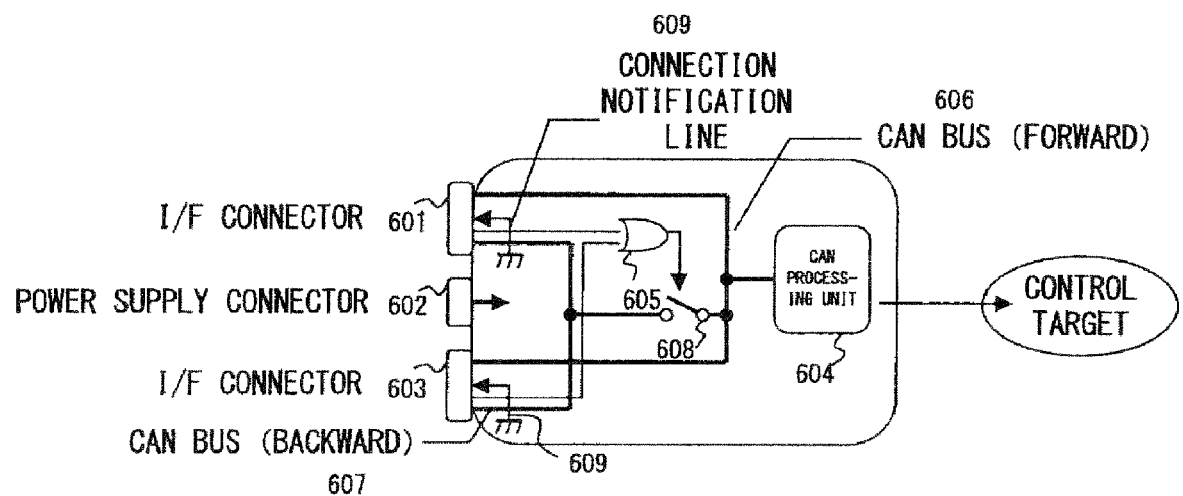
FIG. 6A shows the details of a configuration of a fixed unit in FIG. 5.
Figure 6B:
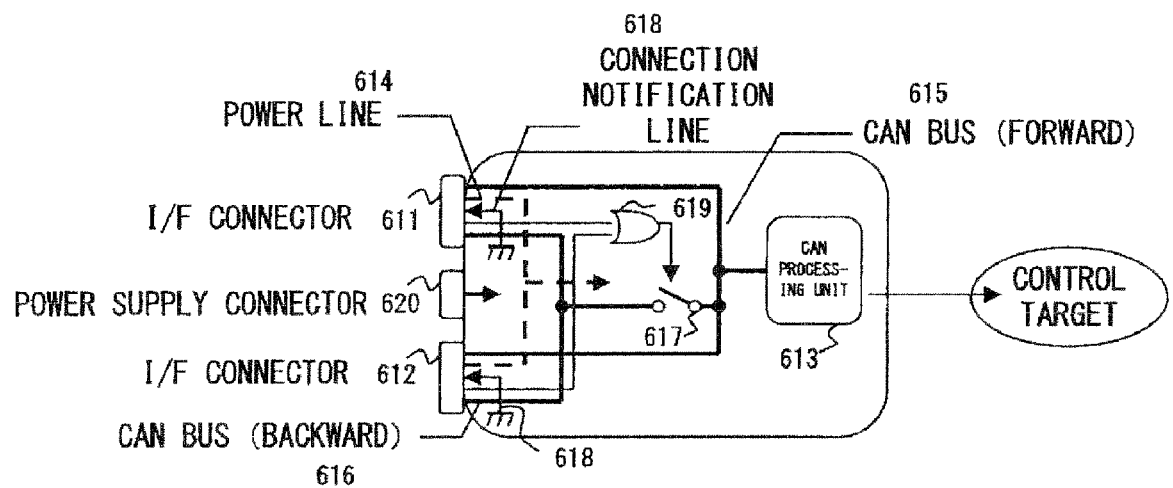
FIG. 6B shows the details of a configuration of an extension unit in FIG. 5.
Figure 6C:
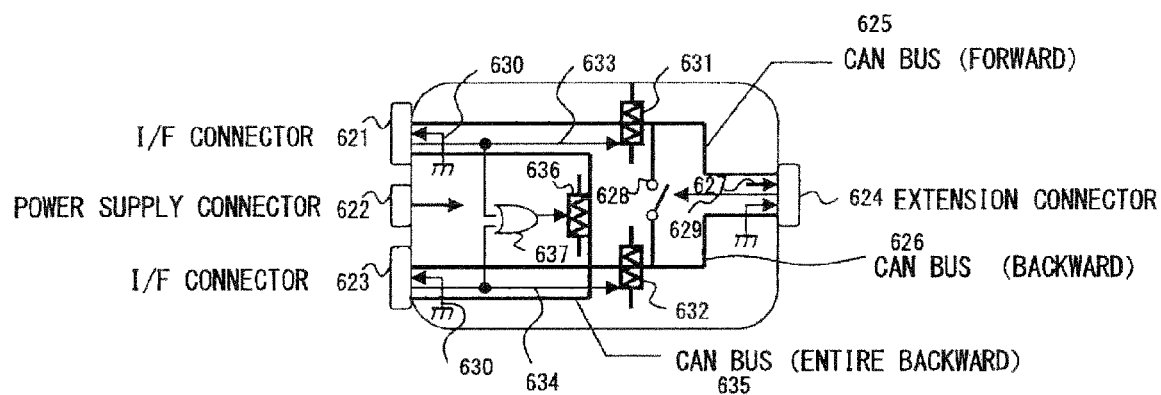
FIG. 6C shows the details of a configuration of an extension port in FIG. 5.

Here, FIGS. 6A, 6B, and 6C are described. These figures respectively show the details of configurations of a fixed unit, an extension unit, and an extension port in the microscope system shown in FIG. 5.

The configuration of the extension unit shown in FIG. 6B is described first. As is known from a comparison made between FIGS. 6B and 2B, the configuration of the extension unit in the second example of the principle of the configuration of the microscope system shown in FIG. 5 is the same as that in the first example shown in FIG. 1.

Namely, the extension unit shown in FIG. 6B comprises I/F connectors 611 and 612, and 2 of 4 connection terminals of the I/F connectors 611 and 612 are interconnected with a two-wire forward CAN bus 615, and the remaining 2 terminals are interconnected with a backward CAN bus 616. Also a CAN processing unit 613 having a CAN transceiver, a CAN controller, and a CPU, which are not shown, is connected to the forward CAN bus 615. Additionally, connection notification lines 618 for notifying an adjacent unit of a connection state are connected to other connection terminals of the I/F connectors 611 and 612. The extension unit also comprises a bus connection switch 617 that is a switch of 2 circuits for connecting or releasing the two-wire CAN buses 615 and 616 for each line. The switching of the bus connection switch 617 is made according to the logic of the output signal of an OR circuit 619. Connection notification lines of other units, which are connected to the I/F connectors 611 and 612, are respectively input to the OR circuit 619. The OR circuit 619 releases the connection between the CAN buses 615 and the 616 by opening the bus connection switch 617 only if other units are connected to both of the I/F connectors 611 and 612.

Furthermore, 2 other connection terminals of the I/F connectors 611 and 612 in the extension unit are connected by a power line 614 that is composed of a power supply line and a ground line. The CAN processing unit 613 and the target of the extension unit are operated by power fed from either of the I/F connectors 611 and 612 to the power line 614. However, for example, if the power consumption of the control target in the extension unit is high, a power supply connector 620 may be provided in the extension unit, and the CAN processing unit 613 and the control target of the extension unit may be operated by power applied to the power supply connector 620.

The configuration of the fixed unit shown in FIG. 6A is described next. As is known from a comparison made with the configuration of the extension unit shown in FIG. 6B, the fixed unit shown in FIG. 6A has a configuration implemented by removing the power line 614 from the extension unit shown in FIG. 6B, and by providing the power supply connector 620 as a replacement.

Namely, the fixed unit shown in FIG. 6A comprises I/F connectors 601 and 603. 2 of 4 connection terminals of the I/F connectors 601 and 603 are interconnected with a two-wire forward CAN bus 606, and the remaining 2 terminals are interconnected with a backward CAN bus 607. Also a CAN microcomputer unit 604 having a CAN transceiver, a CAN controller, and a CPU, which are not shown, is connected to the forward CAN bus 606. The CAN processing unit 604 and the control target of the fixed unit are operated by power applied to a power supply connector 602. Additionally, connection notification lines 609 for notifying an adjacent unit of a connection state are connected to other connection terminals of the I/F connectors 601 and 603. The fixed unit also comprises a bus connection switch 608 that is a switch of 2 circuits for connecting or releasing the forward CAN bus 606 and the backward CAN bus 607, which are two-wirer lines, for each line. The switching of the bus connection switch 608 is made according to the logic of the output signal of an OR circuit 605 to which the connection notification lines of other units connected to the I/F connectors 601 and 603 are input. Here, the bus connection switch 608 is opened only if other units are connected to both of the I/F connectors 601 and 603, and the connection between the forward CAN bus 606 and the backward CAN bus 607 is released.

As described above, the fixed unit shown in FIG. 6A is different from that shown in FIG. 2A in a point of comprising the function to connect or release forward and backward CAN buses within the unit itself depending on whether or not an adjacent unit is connected, similar to the extension unit.

The configuration of the extension port shown in FIG. 6C is described next.

As is known from a comparison made between FIGS. 6C and 2C, the configuration of the extension port shown in FIG. 6C in the second example of the principle of the configuration of the microscope system shown in FIG. 5 is implemented by adding a configuration for an entire backward CAN bus 635 used to connect a backward line of a CAN bus, which goes around the entire microscope system with a plurality of forward and backward double lines, to a configuration similar to that in the first example shown in FIG. 1.

Namely, 2 connection terminals for the forward bus of an I/F connector 621, and 2 connection terminals for the forward bus of an extension connector 624 are interconnected with a two-wire forward CAN bus 625 in the extension port shown in FIG. 6C. Additionally, 2 connection terminals for the forward bus (not for the backward bus) of an I/F connector 623, and 2 connection terminals for the backward bus of the extension connector 624 are interconnected with a two-wire backward CAN bus 626. Furthermore, connection notification lines 630 for notifying an adjacent unit of a connection state are connected to other connection terminals of the I/F connectors 621 and 623.

The extension port also comprises a bus connection switch 628 that is actually a switch of 2 circuits, which connects or releases the forward CAN bus 625 and the backward CAN bus 626, which are two-wire lines, for each line. The switching of the bus connection switch 628 is made according to the logic of the signal of a connection notification line 629. A detecting circuit (not shown in FIG. 6C) similar to that of FIG. 3 releases the forward CAN bus 625 and the backward CAN bus 626 by opening the bus connection switch 628 if another unit is connected to the extension connector 624. Or, the detecting circuit connects the forward CAN bus 625 and the backward CAN bus 626 by closing the bus connection switch 628 if another unit is not connected to the extension connector 624.

A termination resistor 631 is arranged on the forward CAN bus 625 between the I/F connector 621 and the bus connection switch 628. This resistor terminates the lines of the two-wire forward CAN bus 625 according to the logic of the signal of a connection notification line 633 if another unit is not connected to the I/F connector 621. In the meantime, a termination resistor 632 is arranged on the backward CAN bus 626 between the I/F connector 623 and the bus connection switch 628. This resistor terminates the lines of the two-wire backward CAN bus 626 according to the logic of the signal of a connection notification line 634 if another unit is not connected to the I/F connector 623.

Additionally, a power supply connector 622 is a connector to which a power supply line LP for supplying power to the units, which configure the microscope system, is connected. The switching operation of the bus connection switch 628, and the insertion/extraction operations of the termination resistors 631 and 632 in the extension port are performed by power applied to the power supply connector 622. Furthermore, the power applied to the power supply connector 622 is also led to the extension connector 624 via a power line 627, and also supplied to another unit connected to the extension connector 624.

In addition to the above described configuration, the extension port shown in FIG. 6C is implemented by interconnecting 2 connection terminals for the backward bus of the I/F connector 621 and 2 connection terminals for the backward bus of the I/F connector 623 with a two-wire entire backward CAN bus 635.

A termination resistor 636 is arranged on the entire backward CAN bus 635 between the I/F connectors 621 and 623. This resistor terminates the lines of the two-wire entire backward CAN bus 635 if another unit is not connected to either of the I/F connectors 621 and 623.

Switching of the connection/release of the termination resistor 636 to/from the entire backward CAN bus 635 is made according to the logic of the output signal of an OR circuit 637. 2 input terminals of the OR circuit 637 are respectively connected to the connection terminals of the I/F connectors 621 and 623, to which connection notification lines of other units connected to the I/F connectors 621 and 623 are connected. Accordingly, the OR circuit 637 functions as the detecting circuits (311 and 312) shown in FIG. 3. Namely, the OR circuit 637 releases the termination resistor 636 from the entire backward CAN bus 635 by driving the output signal to "L" level if other units are connected to both of the I/F connectors 621 and 623. Or, the OR circuit 637 connects the termination resistor 636 to the entire backward CAN bus 635 by driving the output signal to "L" level, and terminates the bus if another unit is not connected to at least either of the I/F connectors 621 and 623.

The extension port shown in FIG. 6C is configured as described above.

If the microscope system is configured by using the fixed units, the extension units, and the extension ports, which have the above described configurations, both ends of the CAN bus, which goes around the entire microscope system, can be terminated in the same extension port. A state where this CAN interface is configured in the microscope system shown in FIG. 5C is described next.

A state where the power supply source 12 in the second example shown in FIG. 5 supplies power to power supply connectors 514, 524, 534, 544, and 554 via the power supply line LP, and a state where the power supply source 7 supplies power are similar to those in the first example shown in FIG. 1. Therefore, their descriptions are omitted.

In FIG. 5, since another unit is not connected to an I/F connector 511 in the fixed unit 501, a bus connection switch 512 is closed, and forward and backward CAN buses within the fixed unit 501 are connected. Accordingly, the forward CAN bus L1-F and the backward CAN bus L1-B, which are connected to the I/F connector 513, are connected within the fixed unit 501.

Since another unit is not connected to an extension connector 527 in the extension port 502, a bus connection switch 522 is closed, and forward and backward CAN buses within the extension port 502 are connected. Additionally, the fixed unit 501 is connected to an I/F connector 521 via the I/F connector 513, and the extension port 503 is connected to an I/F connector 523. Therefore, neither of termination resistors 525 and 526 terminates the buses. Accordingly, the forward CAN bus L1-F among the CAN buses connected to the I/F connector 521 is drawn from the I/F connector 523 to the forward CAN bus L2-F via an entire backward CAN bus within the extension port 502. Additionally, the backward CAN bus L1-B is drawn from the I/F connector 523 to the backward CAN bus L2-B via the forward and the backward CAN buses within the extension port 502.

In the extension port 503, the extension port 502 is connected to an I/F connector 531, and the fixed unit 504 is connected to an I/F connector 533. Therefore, neither of termination resistors 535 and 536 terminates buses. Additionally, since the extension unit 4 is connected to an extension connector 537, a bus connection switch 532 is opened, and forward and backward CAN buses within the extension port 503 are released. Accordingly, the forward CAN bus L2-F among the CAN buses connected to the I/F connector 531 is drawn from the I/F connector 533 to the forward CAN bus L3-F via an entire backward CAN bus within the extension port 503. Additionally, the backward CAN bus L2-B is drawn to the forward CAN bus L4-F via the forward CAN bus within the extension port 503, and the extension connector 537.

A route on which the forward CAN bus L4-F returns to the backward CAN bus L4-B via the extension units 4, 5, and 6, the forward CAN buses L5-F and L6-F, and the backward CAN buses L6-B and L5-B is similar to that of the first example shown in FIG. 1. Therefore, its description is omitted.

Since the bus connection switch 532 within the extension port 503 is opened as described above, the backward CAN bus L4-B, which is connected to the extension connector 537 of the extension port 503, is connected to the backward CAN bus L3-B, which is connected to the I/F connector 533, via the backward CAN bus within the extension port 503.

In the fixed unit 504, the extension port 503 is connected to an I/F connector 541, and the extension port 505 is connected to an I/F connector 543. Therefore, a bus connection switch 542 is opened. Accordingly, the forward CAN bus L3-F among the CAN buses connected to the I/F connector 541 is connected to the forward CAN bus L7-F, which is connected to the I/F connector 543, via a forward CAN bus within the fixed unit 504. Additionally, the backward CAN bus L3-B is connected to the backward CAN bus L7-B, which is connected to the I/F connector 543, via a backward CAN bus within the fixed unit 504.

In the extension port 505, the fixed unit 504 is connected to an I/F connector 551. Therefore, a forward CAN bus within the extension port 505 is not terminated by a termination resistor 555. Additionally, since the extension unit 9 is connected to an extension connector 557, a bus connection switch 552 is opened, and the forward and backward CAN buses within the extension port 505 are released. Accordingly, the backward CAN bus L7-B among the CAN buses connected to the I/F connector 551 is drawn to the forward CAN bus L8-F via the forward CAN bus within the extension port 505, and the extension connector 557.

A route on which the forward CAN bus L8-F returns to the backward CAN bus L8-B via the extension units 9 and 8, the forward CAN bus L9-F, and the backward CAN bus L9-B is similar to that of the first example shown in FIG. 1. Therefore, its description is omitted.

As described above, the bus connection switch 552 within the extension port 505 is opened. Therefore, the forward and the backward CAN buses within the extension port 505 are released. In the meantime, another unit is not connected to an I/F connector 553. Therefore, a termination resistor 556 is connected to the backward CAN bus within the extension port 505, and a termination resistor (not shown in FIG. 5) is additionally connected to an entire backward CAN bus within the extension port 505 (see FIG. 6C). Accordingly, the backward CAN bus L8-B, which is connected to the extension connector 557, is terminated by the termination resistor 556 via the backward CAN bus within the extension port 505. Additionally, the forward CAN bus L7-F, which is connected to the I/F connector 551, is terminated by the termination resistor (not shown in FIG. 5) via the entire backward CAN bus within the extension port 505.

In the microscope system shown in FIG. 5, the extension port 505 and the fixed unit 504 are configured to be included in the system power supply unit that is a component essential to the microscope system. With this configuration, 2 units required to terminate a bus in the first example shown in FIG. 1 can be reduced to 1, and the CAN bus, which goes around the microscope system, is configured to return to the same extension port 505 after starting at the extension port 505 comprised by the system power supply unit, and going around the system once. As described above, in the microscope system shown in FIG. 5, the CAN bus, which goes around the microscope system, is implemented as a double line composed of forward and backward lines, the forward and the backward lines are connected with the bus connection switch 512 within the fixed unit 501, which is one end of the CAN bus, and the termination resistors are connected respectively to the forward and the backward lines in the extension port 505, which is the other end of the CAN bus. With this configuration, a user can surely construct a suitable CAN bus only by performing an operation for simply connecting an individual functional unit without being conscious of a termination position, for example, in a case where the microscope system is included as an optical component in another apparatus (in the case where the main body as the microscope does not exist because the system is incorporated in the body of another apparatus).

Note that the principle of the configuration shown in FIG. 5 may be applied to the specific configuration of the microscope system shown in FIG. 4. Namely, it is feasible with ease to realize a configuration such that both ends of the CAN bus are terminated only by the extension port 416 within the system power supply source 401 by implementing the entire CAN bus as forward and backward double lines, instead of terminating the CAN bus, which goes around the microscope system, with the extension port 416 within the system power supply source 401, and the extension port 427 within the floodlight tube 410.

Additionally, a fixed unit and an extension port are implemented as separate constituent elements in FIG. 5. However, the unit and the port may be integrated.

As described above, in all of the preferred embodiments according to the present invention, individual functions of the microscope is divided into units, each of which is endowed with a CAN bus interface, a CAN bus interface circuit of an extension unit is made not to comprise the function to terminate a bus, and part of a CAN bus is relayed and returned when the units are connected with the CAN bus existing within the microscope system. Additionally, each unit is configured to have not only the function to open the CAN bus and pass the bus to a succeeding stage, but also the function to supply power to the succeeding stage if another extension unit is connected in the succeeding stage.

With such a configuration, the wiring savings, and the degree of freedom of an assembly of the microscope system can be improved, and at the same time, the number of occurrences of problems of system operations due to an assembly error, etc. can be reduced, and a CAN bus can be effectively applied to the microscope system.

The preferred embodiments according to the present invention have been described above. However, the present invention is not limited to the above described preferred embodiments, and various improvements and modifications can be made within a scope that does not depart from the gist of the present invention.

For example, an exclusive power supply connector is provided to supply power to a fixed unit and an extension port in the above described preferred embodiments. Alternatively, a power supply can be made by using another connection terminal of an I/F connector, to which a CAN bus is connected, similar to an extension unit.

What is claimed is:

1. A microscope system, comprising:
   an intra-system bus line for transmitting control data for controlling operations of the microscope system;
   a switch connected in series to the intra-system bus line at some point on the intra-system bus line;
   an extension connector to which an extension unit, which comprises at least a processing device for transmitting/receiving the control data, and an intra-unit bus line that the processing device uses to transmit/receive the control data, is connected; and
   a detecting unit for detecting whether or not the extension unit is connected to the extension connector, and for opening/closing the switch based on a result of detection, wherein:
   the switch releases the intra-system bus line at a position of the switch when opened, and connects the intra-system bus line at the position of the switch when closed,
   the intra-system bus line is led from both sides of the switch to the extension connector, and connected via the intra-unit bus line if the extension unit is connected to the extension connector, and
   the detecting unit opens the switch if it detects that the extension unit is connected to the extension connector, and closes the switch if it detects that the extension unit is not connected to the extension connector.

2. The microscope system according to claim 1, wherein the intra-system bus line is a controller area network (CAN) bus used with a CAN protocol.

3. The microscope system according to claim 1, wherein a power line for supplying power to the extension unit is led to the extension connector.

4. The microscope system according to claim 1, wherein resistors for terminating the intra-system bus line are respectively provided at both ends of the intra-system bus line.

5. The microscope system according to claim 4, wherein the intra-system bus line comprises double lines composed of forward and backward lines, the forward and the backward lines are connected at one end of the intra-system bus line, and the resistors are respectively connected to the forward and the backward lines at the other end of the intra-system bus line.

6. An extension unit connected to the microscope system according to claim 1, wherein:
   the extension unit comprises at least the processing device and the intra-unit bus line, and
   the intra-system bus line, which is led from both sides of the switch to the extension connector, is connected via the intra-unit bus line by being connected to the extension connector.

7. The extension unit according to claim 6, further comprising:
   an intra-unit switch connected in series to the intra-unit bus line at some point on the intra-unit bus line;
   an I/F connector to which another extension unit that is the same as the extension unit is connected; and
   an intra-unit detecting unit for detecting whether or not the extension unit is connected to the extension connector of the microscope system, and whether or not the another extension unit is connected to I/F connector, and for opening/closing the intra-unit switch based on a result of detection,
   wherein:
   the intra-unit switch releases the intra-unit bus line at a position of the intra-unit switch when opened, and connects the intra-unit bus line at the position of the intra-unit switch when closed,
   the intra-unit bus line is led from both sides of the intra-unit switch to the I/F connector, and connected via an intra-unit bus line of the another extension unit if the another extension unit is connected to the I/F connector, and
   the intra-unit detecting unit opens the intra-unit switch if it detects that the extension unit is connected to the extension connector of the microscope system, and that the another extension unit is connected to the I/F connector, and closes the intra-unit switch otherwise.

8. The extension unit according to claim 7, wherein a power line for supplying power to the another extension unit is led to the I/F connector.

9. A system comprising:
   (i) a microscope system, comprising:
      an intra-system bus line for transmitting control data for controlling operations of the microscope system;
      a switch connected in series to the intra-system bus line at some point on the intra-system bus line;
      an extension connector to which an extension unit, which comprises at least a processing device for transmitting/receiving the control data, and an intra-unit bus line that the processing device uses to transmit/receive the control data, is connected; and
      a detecting unit for detecting whether or not the extension unit is connected to the extension connector, and for opening/closing the switch based on a result of detection, wherein:
the switch releases the intra-system bus line at a position of the switch when opened, and connects the intra-system bus line at the position of the switch when closed,
the intra-system bus line is led from both sides of the switch to the extension connector, and connected via the intra-unit bus line if the extension unit is connected to the extension connector, and
the detecting unit opens the switch if it detects that the extension unit is connected to the extension connector, and closes the switch if it detects that the extension unit is not connected to the extension connector; and (ii) an extension unit connected to the microscope system, wherein:
the extension unit comprises at least the processing device and the intra-unit bus line, and
the intra-system bus line, which is led from both sides of the switch to the extension connector, is connected via the intra-unit bus line by being connected to the extension connector.

10. The system according to claim 9, wherein the extension unit further comprises:
an intra-unit switch connected in series to the intra-unit bus line at some point on the intra-unit bus line;
an I/F connector to which another extension unit that is the same as the extension unit is connected; and
an intra-unit detecting unit for detecting whether or not the extension unit is connected to the extension connector of the microscope system, and whether or not the another extension unit is connected to the I/F connector, and for opening/closing the intra-unit switch based on a result of detection,
wherein:
the intra-unit switch releases the intra-unit bus line at a position of the intra-unit switch when opened, and connects the intra-unit bus line at the position of the intra-unit switch when closed,
the intra-unit bus line is led from both sides of the intra-unit switch to the I/F connector, and connected via an intra-unit bus line of the another extension unit if the another extension unit is connected to the I/F connector, and
the intra-unit detecting unit opens the intra-unit switch if it detects that the extension unit is connected to the extension connector of the microscope system, and that the another extension unit is connected to the I/F connector, and closes the intra-unit switch otherwise.

11. The extension unit according to claim 10, wherein a power line for supplying power to the another extension unit is led to the I/F connector.

* * * * *